United States Patent [19]

Webster et al.

[11] Patent Number: 5,237,281
[45] Date of Patent: Aug. 17, 1993

[54] ION DRAG AIR FLOW METER

[75] Inventors: Jackie R. Webster, Irvine; David B. Chang, Tustin; Keith V. Pearson, Long Beach, all of Calif.

[73] Assignee: Hughes Aircraft Company, Los Angeles, Calif.

[21] Appl. No.: 612,177

[22] Filed: Nov. 13, 1990

[51] Int. Cl.$^5$ .............................................. G01N 27/64
[52] U.S. Cl. ........................................ 324/469; 250/381; 250/384; 250/385.1; 73/861.09
[58] Field of Search ............... 324/469; 250/381, 384, 250/385.1; 73/861.09

[56] References Cited

U.S. PATENT DOCUMENTS

| | | | |
|---|---|---|---|
| 2,611,268 | 9/1952 | Mellen | 73/861.09 |
| 2,861,452 | 11/1958 | Morgan | 73/861.09 |
| 2,954,474 | 9/1960 | Lawrance | 250/381 |
| 3,683,178 | 8/1972 | Buran et al. | 250/381 |
| 3,735,138 | 5/1973 | Rork et al. | 250/381 |
| 4,220,195 | 9/1980 | Borgoyn et al. | 165/1 |
| 4,238,678 | 12/1980 | Castleman et al. | 250/384 |
| 4,441,371 | 4/1984 | Cockshott et al. | 73/861.09 |
| 4,953,407 | 9/1990 | Malaczynski et al. | 73/861.09 |
| 5,023,450 | 6/1991 | Gold | 250/385.1 X |
| 5,160,916 | 11/1992 | Ishii et al. | 250/381 X |

OTHER PUBLICATIONS

An Ionization Anemometer, By: J. E. Lovelock and E. M. Wasilewska Medical Research Council, Group for Research in Industrial Physiology, Harvard Hospital, Salisbury, Wiltshire Nov. 26, 1949.

Primary Examiner—Kenneth A. Wieder
Assistant Examiner—Glenn W. Brown
Attorney, Agent, or Firm—Michael W. Sales; Terje Gudmestad; Wanda K. Denson-Low

[57] ABSTRACT

An ion drag air flow meter (10) including a gas ionizer (16), an ion collector (14) and apparatus (30) for converting the collected ions into a signal providing an indication of the flow of a gas (40).

6 Claims, 1 Drawing Sheet

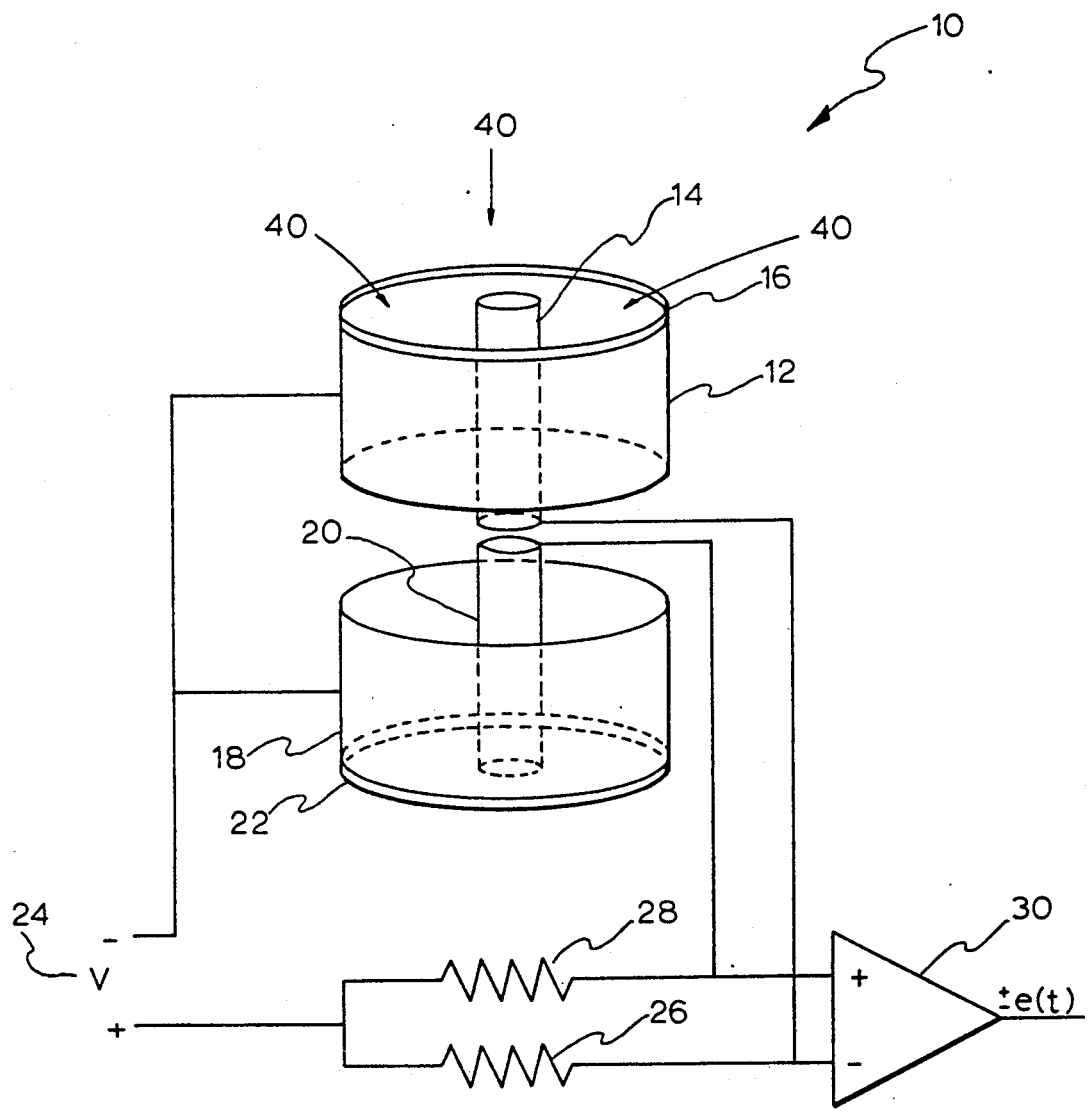

ION DRAG AIR FLOW METER

BACKGROUND OF THE INVENTION

1. Field of the Invention

The present invention relates to air flow meters. More specifically, the present invention relates to ion drag air flow meters or ion drag anemometers.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

High performance engines require precise measurement of air/fuel ratio to achieve optimum performance and to meet current emission standards. This function is performed by an air flow meter. The harsh environment of the automobile engine places significant restrictions on the design of conventional air flow meters. For example, the sensors of the meter must be able to withstand the extreme temperatures, humidities and pressures to perform adequately in a conventional internal combustion engine.

Many current air flow meter sensors are based on the principle of a heated wire or film placed in or adjacent to the air flow. These devices sense heat removal as air passes the wire or film. Those skilled in the art may appreciate that the limitations of these sensors include a lack of ruggedness, susceptibility to fouling and inability to sense flow direction. Further, the response of these sensors is often limited by the mass and construction thereof.

Further, few conventional sensors can actually measure air mass flow. This measure provides information on the amount of air mass which is being burned by the engine and is of considerable utility in the effort to achieve optimum engine performance.

Thus, there is a need in the art for an air flow meter for a rugged, high performance air flow meter capable of measuring air mass flow.

SUMMARY OF THE INVENTION

The need in the art is addressed by the ion drag air flow meter of the present invention which includes a gas ionizer, an ion collector and apparatus for converting the collected ions into a signal providing an indication of the flow of the gas.

In a specific embodiment, the invention utilizes an emitting isotope to ionize the air mass flowing through an ion chamber. The ion chamber consists of two cylinders, each having an inner conductor. A voltage is applied between the cylinder and the inner conductor. The ions are collected by the inner conductors. The current generated by the inner conductor is converted to a voltage indicative of the air mass flow.

BRIEF DESCRIPTION OF THE DRAWINGS

The Figure is a schematic diagram of an illustrative implementation of an ion drag sensor constructed in accordance with the teachings of the present invention.

DESCRIPTION OF THE INVENTION

Illustrative embodiments and exemplary applications will now be described with reference to the accompanying drawings to disclose the advantageous teachings of the present invention.

The Figure is a schematic diagram of an illustrative implementation of an ion drag sensor constructed in accordance with the teachings of the present invention. The sensor 10 includes a first cylinder 12 acting as a cathode and a first inner conductor 14 acting as an anode. The first cylinder 12 and the first inner conductor 14 provide a first ion chamber. A first annular emitter source 16 is provided at the top of the first cylinder 12. The first annular emitter source 16 is a radioisotope emitting beta particles, i.e., Carbon-14. The first annular emitter source ionizes air flowing through the first ion chamber. Ionization of air flowing into the chamber is caused by the collision of the beta particles with one or more of the orbital electrons of the gas atoms or molecules; thus a positive ion and negative ion are formed (i.e. an ion pair).

A second cylinder 18 and a second inner conductor 20 make up a second ion chamber. A second annular emitter source 22, identical to the first, is provided at the bottom of the second cylinder 18. In the preferred embodiment, the annular emitter source 22 is also a radioisotope emitting beta particles, i.e., Carbon-14.

An electric field is set up between each cylinder 12 and 18 and the associated inner conductor 14 and 20 by an applied voltage 24. In the preferred embodiment, the negative terminal is connected to each of the cylinders 12 and 18. The positive terminal is connected to the first inner conductor 14 through a first resistor 26 and to the second inner conductor 20 through a second resistor 28. Negative ions are collected at the inner conductors 14 and 20. The first inner conductor 14 is also connected to the negative terminal of an operational amplifier 30 while the second inner conductor 20 is connected to the positive terminal of the operational amplifier 30.

The number of ion chambers and the dimensions, shape, and placement of each may be determined by one of ordinary skill in the art, having access to the teachings provided herein, as necessary for a given application.

Air or other gas 40 flowing into the first cylinder 12 and out the second cylinder 18 causes more ions to be collected in the first inner conductor 14 than the second conductor 20. The amplitude of the resulting output of the operational amplifier is indicative of the air flow rate and the polarity thereof is indicative of the air flow direction. If a positive ion radioactive source is used (e.g. an alpha emitter), the polarity of the electrodes is reversed.

The output will have a transfer function such that $$e(t) = A + B^*Fr \qquad [1]$$

where: e(t) is the output signal voltage, Fr is the mass flow rate and the constants A and B would be established as calibration parameters.

For a radioactive source of area A cm$^2$ and of source strength S curies, the current density of ionizing particles is:

$$J = (S/A)^*3.7 \times 10^{10} \text{ particles/cm2sec} \qquad [2]$$

If the ionizing particles are beta particles or electrons, the range L in air is $$L = 1.4 \times 10^{-7} TU^2/pM \text{ cm} \quad [3]$$

where T is the temperature in degrees Kelvin, U is the energy in eV, p is the pressure in mm Hg and M is the (average) molecular weight of the air. On the other hand, if the ionizing particles are alpha particles, the range in air is $$L = bU^{3/2} \text{ cm} \quad [4]$$

where $$b = 2.38 \times 10^{-7}/760. \quad [5]$$

The energy required to create an ion pair in air is $$\epsilon \approx 32.4 \text{ eV}. \quad [6]$$

Thus, the number of electrons created by impact ionization per second per cubic centimeter is $$\partial n/\partial t \approx JU/\epsilon L \quad [7]$$

within the ionizing particle range of the radioactive source. The recombination rate of the created ion pairs in air at standard temperature and pressure is $$\partial n/\partial t \approx \alpha n^2 \text{ cm}^{-3}\text{sec}^{-1} \quad [8]$$

where n is the density (electrons per cubic centimeter) and $\alpha = 1.71 \times 10^{-6}$. Accordingly, at equilibrium $$\alpha n^2 = JU/\epsilon L. \quad [9]$$

For a voltage V applied between the radioactive source location and a collecting electrode at a distance $d \approx L$ from the source, the drift velocity of the electrons will be $$v = \mu V/d \quad [10]$$

where $$\mu = e/mv \quad [11]$$

and $$v = N\sigma v_\theta \quad [12]$$

where e is the electronic charge, m the electron mass, and the collision frequency is expressed in terms of the molecular density N of the air, the cross section of the air molecules $\sigma$ and the thermal electron velocity $v_\theta$. The resulting current density is $$j = nev. \quad [13]$$

For a sensitive air flow meter, v would be of the same magnitude as the velocity of flow $V_{Flow}$, and the mean-free path $(N\sigma)^{-1}$ would be much less than d. To cover a wide range of velocities, it may be necessary to use more than one source situated at different positions along the flow direction relative to the collectors.

For typical $\beta$ and $\alpha$ emitters, use of these relations indicates that for reasonable voltages (<100 volts), source strengths (10–100 $\mu$curies), dimensions (cm), it should be possible to measure air flows in the range of interest for vehicle engines.

Alpha particles, beta particles and gamma radiation are three types of ionizing radiation given off during the decay process of radioisotopes.

Gamma radiation is very penetrating. Air, being not very dense, has a low stopping power (i.e., probability of collisions or absorption) for this type of radiation. It is therefore not a viable candidate for use as a short range ion generator.

The alpha particle, on the other hand, is a very large particle (its mass is $\approx 7280$ times larger than an electron) and is a very good ion producer in air if it has sufficient energy. However, due to the fact that it has a large mass, its path is somewhat deflected by a high velocity gas.

Beta particle radiation of the appropriate energy range (velocity range) also is a good ionizing source for gases. Several considerations must be taken into account in the selection of the appropriate beta emitting isotope including half-life of the material and the form of which is currently available.

The half-life can be defined as the time in which there is one half of the original quantity of radioactive material. The number of unstable atoms, Q, at time t, is given in Equation [14] below:

$$Q = Q_o \exp(-\gamma t) \quad [14]$$

$Q_o$ being the original number of unstable atoms at time $t = 0$ and $\gamma$ is the value of the decay constant which is unique for each radioisotope. From the definition of the half-life of a radioisotope, it is evident that a longer half-life is desirable in the selection of an appropriate material. The current collected at any fixed air velocity is directly proportional to the amount of ions created, which in turn is directly proportional to the amount of radiation. Since this decreases with time, the source should have a half-life much longer than the expected lifetime of the measuring device. If the half-life is too short, either a recalibration of the instrument will be required or some mechanism for compensating for this decay must be incorporated.

Carbon-14 has a medium energy beta with a very long half-life (5,568 years). Carbon-14 can be obtained in almost any chemical form. Carbon-14 can be prepared by irradiating carbon dioxide in a reactor and chemically converting the irradiated carbon dioxide to methanol from which almost any polymer can be made. This allows for almost any type of molding, casting or machine process to be used which facilitates packaging design.

Thus, the present invention has been described herein with reference to a particular embodiment for a particular application. Those having ordinary skill in the art and access to the present teachings will recognize additional modifications applications and embodiments within the scope thereof. For example, the invention is not limited to the use of Carbon-14 as the beta emitting radioisotope. Nor is the invention limited to the use of the inner conductors as the anodes and the outer cylinders as the cathodes. The roles of the inner conductors and the outer cylinders may be reversed. The source can be connected to the inner conductors, while the outer cylinders collect the ions and create a voltage difference at the input of the operational amplifier. Furthermore, the ion chamber may be implemented by the use of parallel plates in place of the cylinder and inner conductor. In addition, the invention may be used to measure the flow of fluids other than gases.

It is therefore intended by the appended claims to cover any and all such applications, modifications and embodiments within the scope of the present invention.

Accordingly,

What is claimed is:

1. An apparatus for measuring the flow of a fluid comprising:
   a voltage source having a first and second terminal;
   ion chamber means for collecting ions, said ion chamber means including an outer conductor connected to a first terminal of the voltage source and an inner conductor connected to a second terminal of the voltage source, the outer conductor surrounding said inner conductor;
   annular radioisotope means disposed at a first end of said chamber means for ionizing the fluid, said radioisotope means consisting essentially of an ionizing source disposed on a peripheral edge of said outer conductor; and
   circuit means electrically coupled to the ion chamber means and the voltage source for converting a signal indicative of the collected ions into a signal to provide an indication of the flow of the fluid.

2. The apparatus of claim 1 wherein said radioisotope means includes a radioisotope for emitting beta particles.

3. The apparatus of claim 1 further comprising:
   a second ion chamber means, said second ion chamber means including a second outer conductor connected to said first terminal of said voltage source and a second inner conductor connected to said second terminal of said voltage source, said second outer conductor surrounding said second inner conductor; and
   second annular radioisotope means disposed at a second end of said second chamber means to ionizing said fluid.

4. The apparatus of claim 3, said first radioisotope being disposed at an intake end of said first outer conductor and said second radioisotope being disposed at an exhaust end of said second outer conductor.

5. The apparatus of claim 1 wherein said circuit means includes an operational amplifier coupled to said ion chamber means and said voltage source to provide an indication of the direction and/or velocity of the flow of the fluid.

6. The apparatus of claim 1 wherein the outer and inner conductors are concentric cylinders.

* * * * *